Aug. 7, 1951  P. DANIELSSON  2,563,008
APPARATUS FOR POSITIONING FISH
Filed April 17, 1945  8 Sheets-Sheet 2

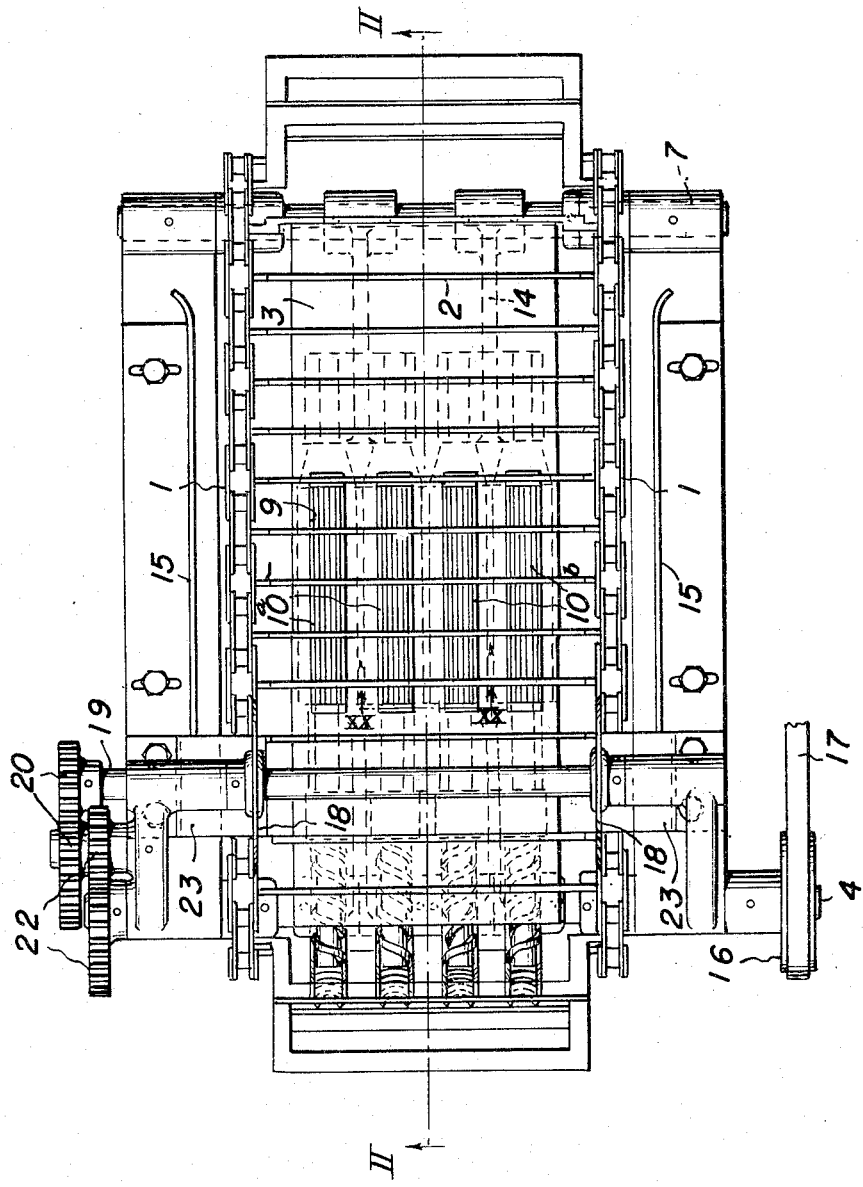

Inventor:
Paul Danielsson,
By Sommers & Young
Attorneys

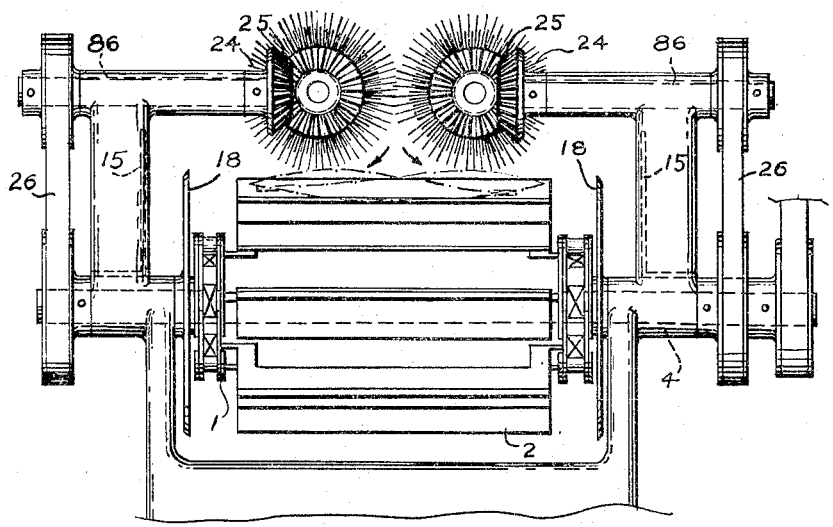
Fig 4
Fig 6
Fig 5
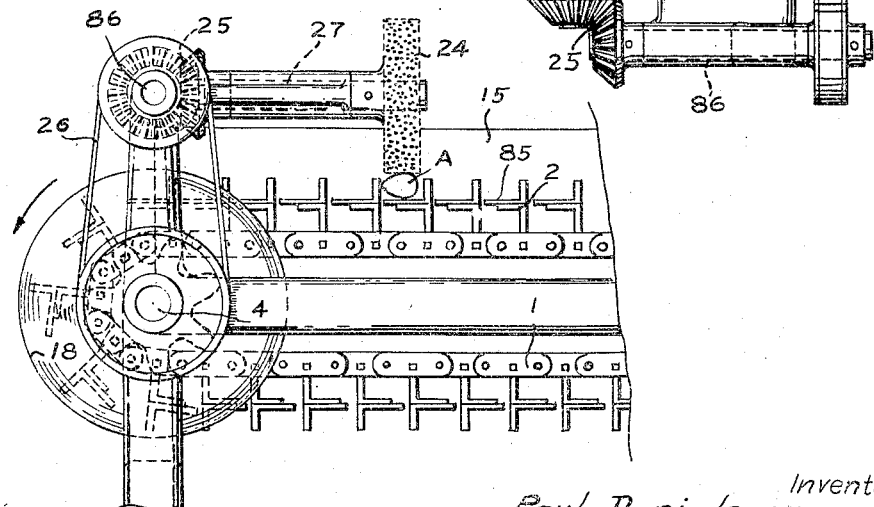
Inventor:
Paul Danielsson,
By Sommers & Young
Attorneys

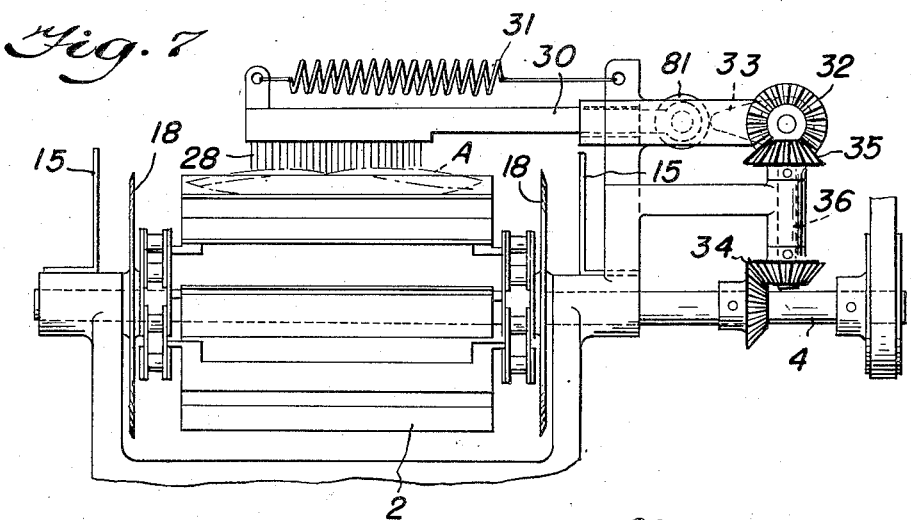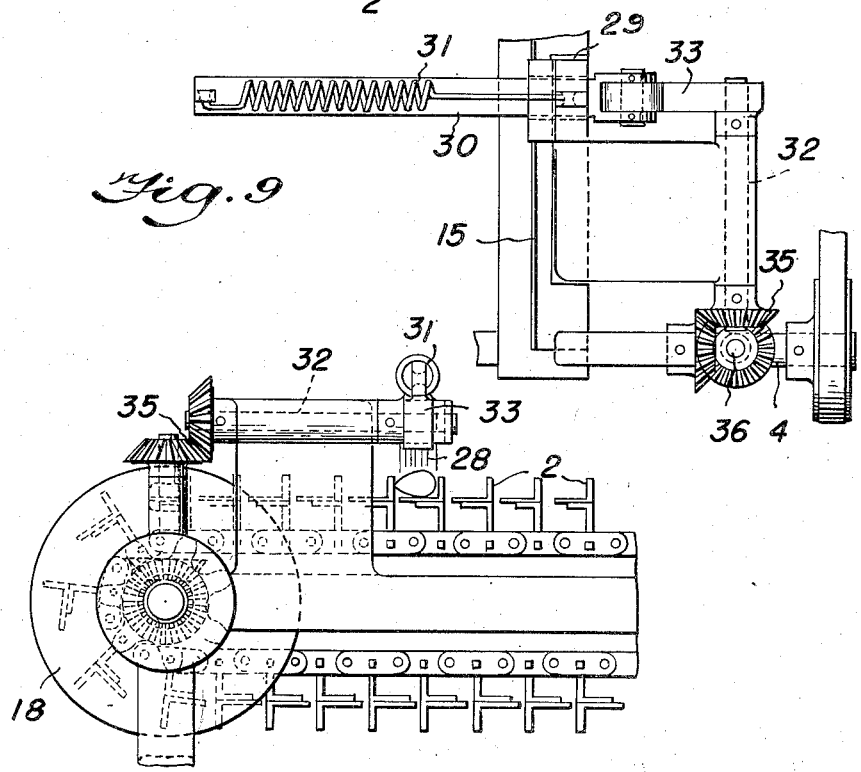

Aug. 7, 1951 P. DANIELSSON 2,563,008
APPARATUS FOR POSITIONING FISH
Filed April 17, 1945 8 Sheets-Sheet 5
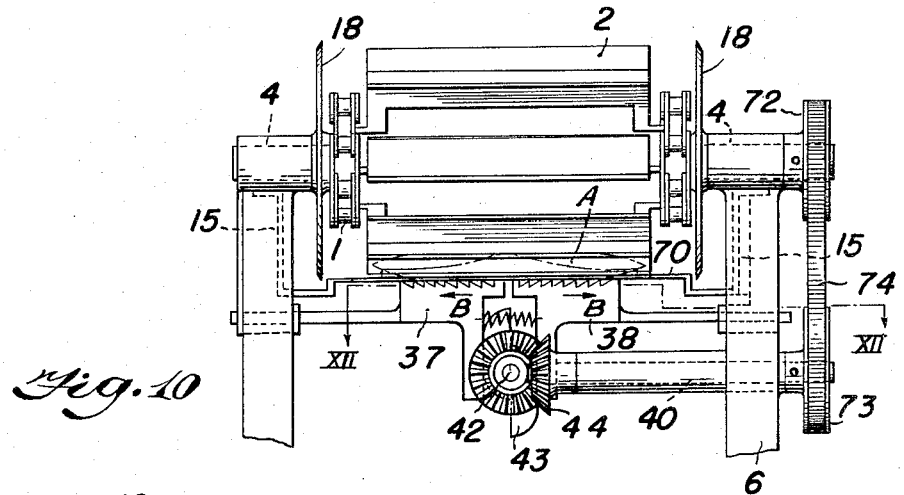
Fig. 10
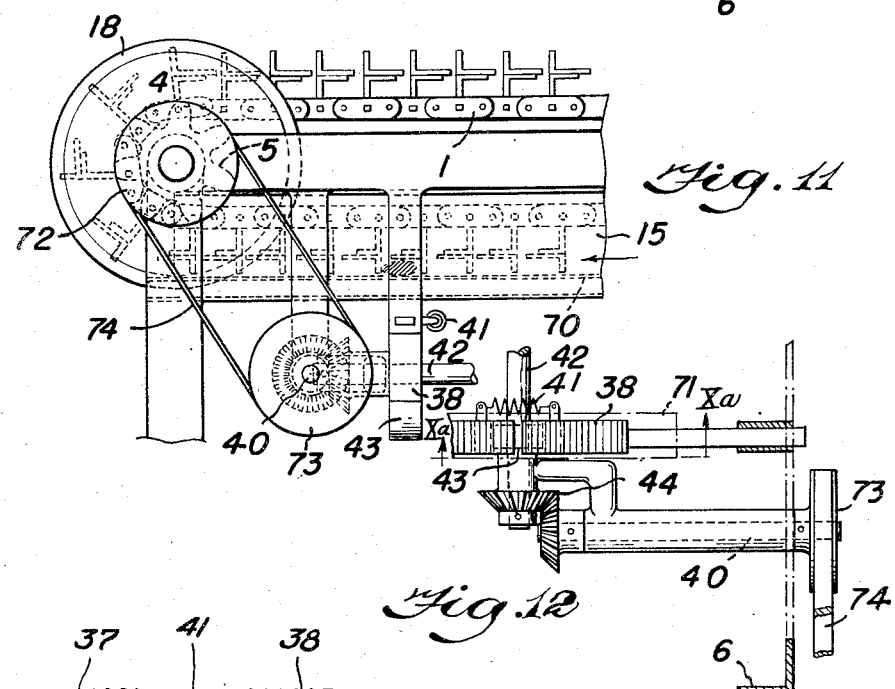
Fig. 11
Fig. 12
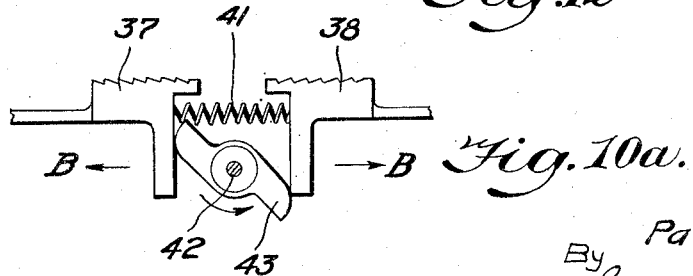
Fig. 10a.
Inventor:
Paul Danielsson,
By Sommers+Young
Attorneys

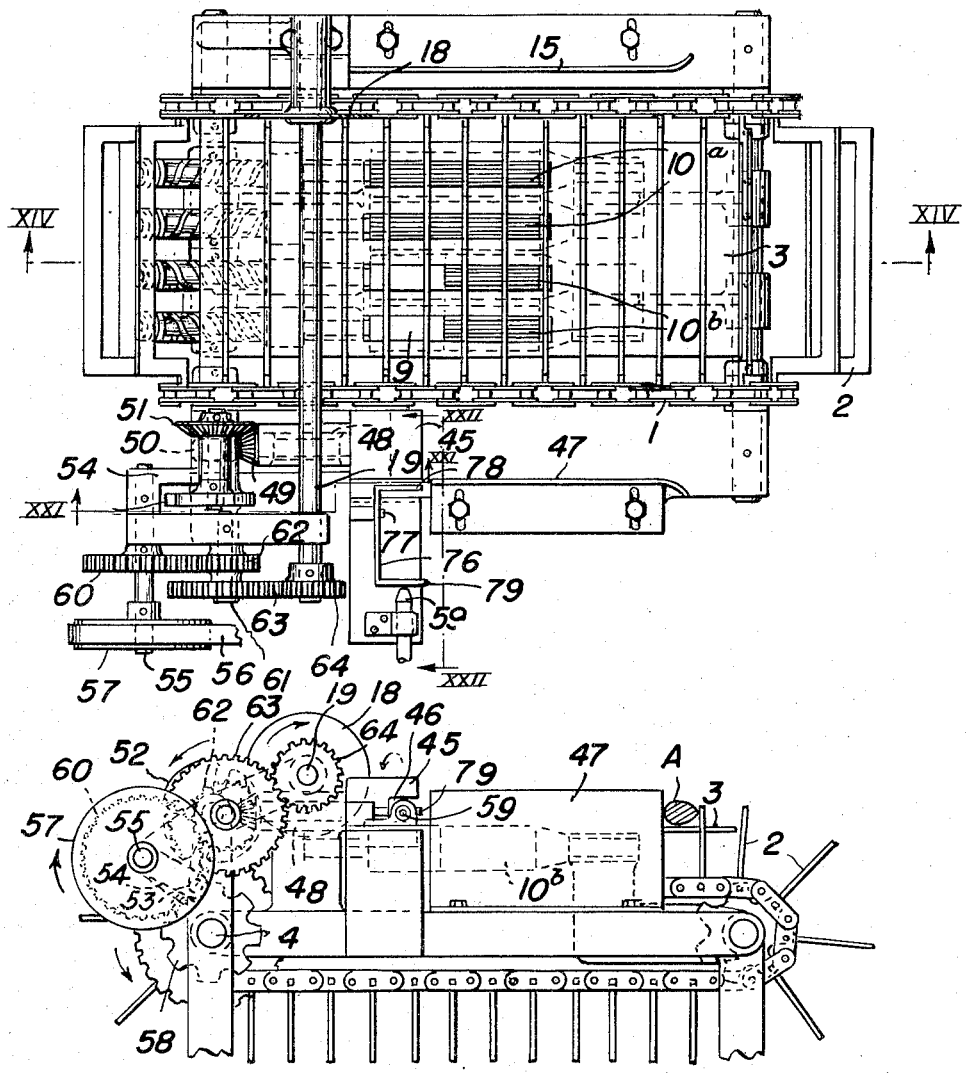

Aug. 7, 1951     P. DANIELSSON     2,563,008
APPARATUS FOR POSITIONING FISH
Filed April 17, 1945     8 Sheets-Sheet 7
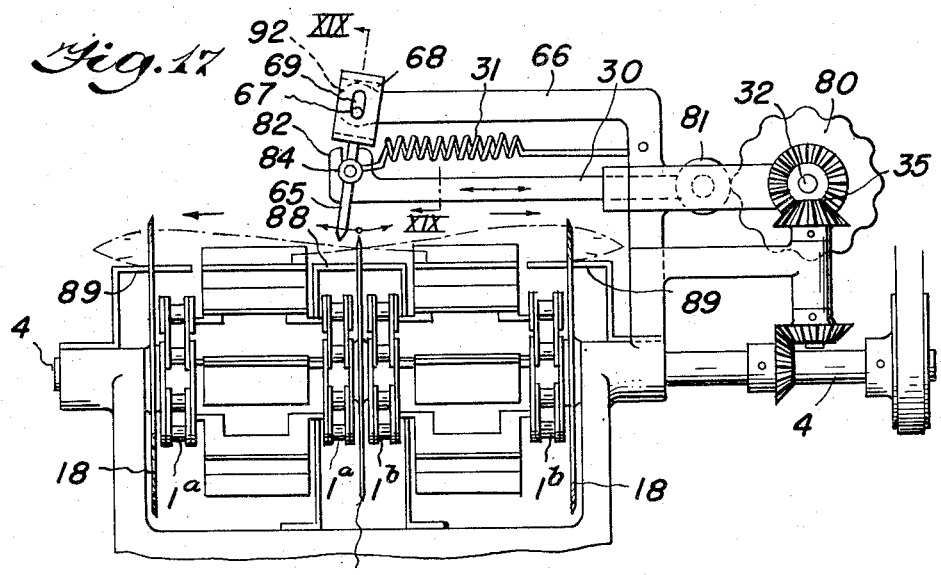
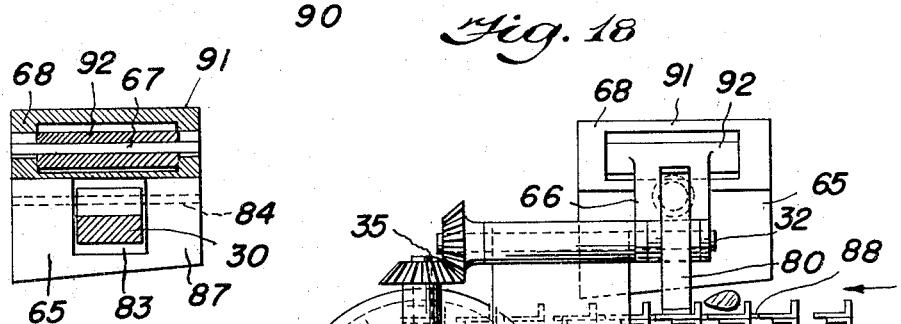
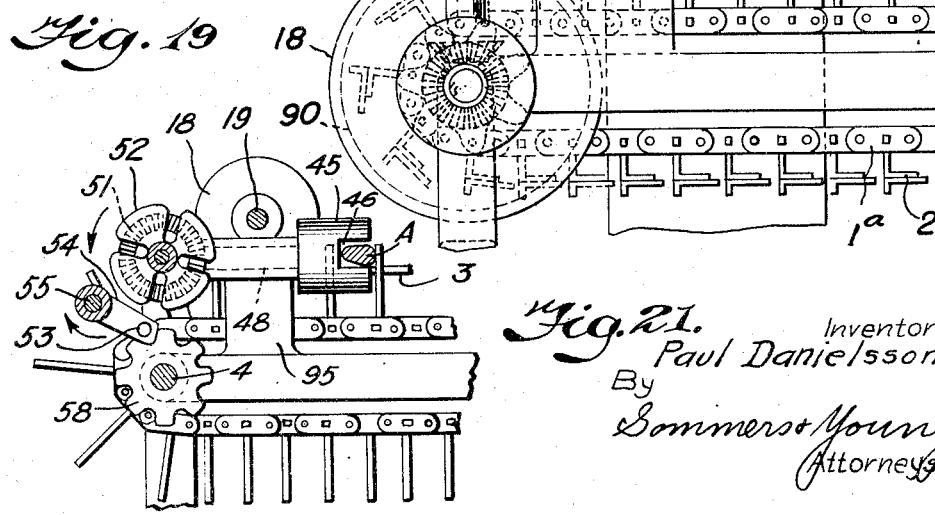
Inventor:
Paul Danielsson,
By
Sommers & Young
Attorneys

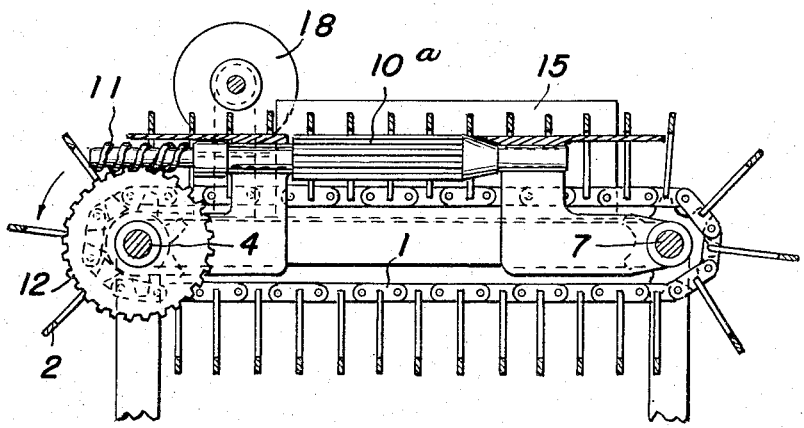
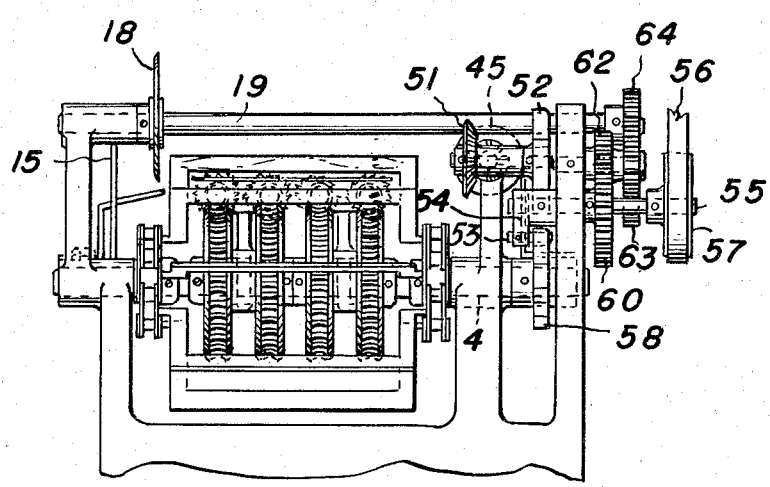
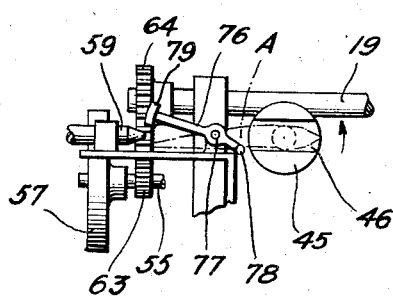

Patented Aug. 7, 1951

2,563,008

UNITED STATES PATENT OFFICE 2,563,008

APPARATUS FOR POSITIONING FISH

Paul Danielsson, Stockholm, Sweden, assignor to Arenco Aktiebolag, Stockholm, Sweden, a joint-stock company of Sweden Application April 17, 1945, Serial No. 588,789
In Sweden April 22, 1944

12 Claims. (Cl. 17—2)

This invention relates to an improved apparatus for uniformly positioning fish which are supplied in an unarranged condition with respect to the directions of their head ends and it is an object of the invention to safely and rapidly arrange the individual fish so that their head ends will be correctly positioned for further treatment of the fish e. g. cutting, decapitating, eviscerating, threading on to spits etc.

Another object of the invention consists in the provision of an apparatus for such positioning whereby failures due to the tendency of the slimy fish to stick together or to the means contacting with them is obviated.

Several ways of carrying the invention into effect will be described with reference to the accompanying drawings in which like characters of reference indicate the same or like parts, and in which:

Fig. 1 is a plan view of a machine provided with means embodying the invention (parts thereof being omitted in the interest of clearness);

Fig. 4 is an elevational end view of the machine provided with another embodiment of the invention;

Fig. 5 is an elevational side view of the end of the machine shown in Fig. 4;

Fig. 6 is a plan view of part of the machine shown in Figs. 4 and 5;

Fig. 7 is an elevational end view of a machine provided with still another embodiment of the invention;

Fig. 8 is an elevational side view of the end of the machine shown in Fig. 7;

Fig. 9 is a plan view of part of the machine shown in Figs. 7 and 8;

Fig. 10 is an elevational end view of a machine provided with still another embodiment of the invention;

Fig. 10a is a sectional view on the line Xa—Xa in Fig. 12, illustrating the operation of certain parts shown in Fig. 10;

Fig. 11 is a side elevational view of the end of the machine shown in Fig. 10;

Fig. 12 is a sectional plan view on the line XII—XII of Fig. 10;

Fig. 13 is a plan view of the machine provided with still another embodiment of the invention;

Fig. 14 is an elevational sectional view on the line XIV—XIV of Fig. 13;

Fig. 15 is an elevational end view of the machine shown in Figs. 13 and 14;

Fig. 16 is an elevational side view of the machine shown in Figs. 13 to 15;

Fig. 17 is an elevational end view of a modification of the embodiment shown in Fig. 7;

Fig. 18 is an elevational side view of the end of the machine shown in Fig. 17;

Fig. 19 is a sectional view on the line XIX—XIX of Fig. 17.

Fig. 21 is a vertical sectional view on the line XXI—XXI of Fig. 13; and

Fig. 22 is a vertical sectional view on the line XXII—XXII of Fig. 13.

Figure 3:
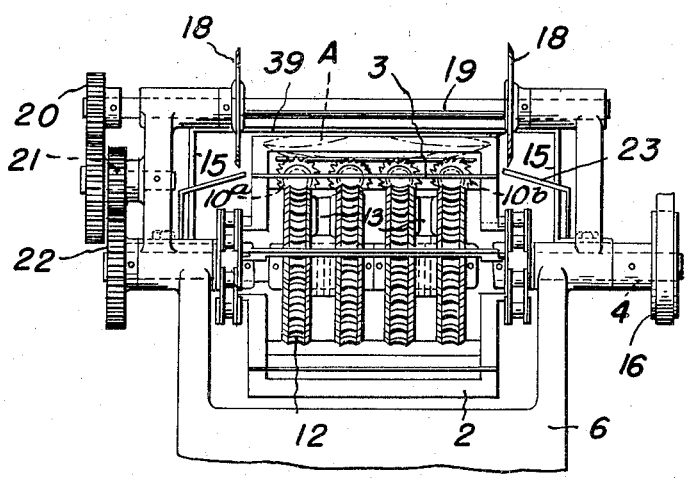
Fig. 3 is an elevational end view of the machine shown in Fig. 2.
Figure 2:
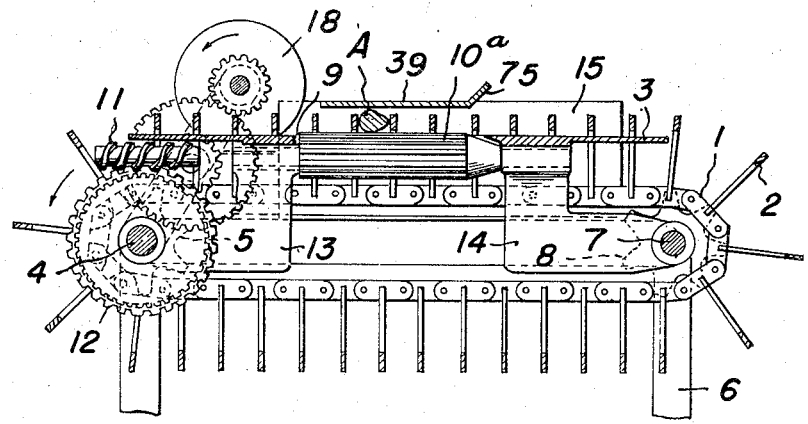
Fig. 2 is a sectional elevational view on a reduced scale on the line II—II of Fig. 1.
Figure 20:
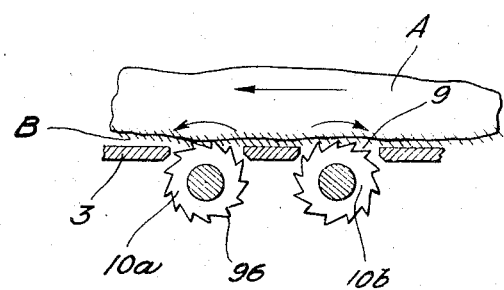
Fig. 20 is a vertical sectional view on an enlarged scale on the line XX—XX of Fig. 1, illustrating the operating of positioning means upon the fish.

Referring to Figs. 1 to 3 of the drawing, an endless fish conveyer consisting of two chains 1 has impellers 2 which are movable transversely over a table 3. The chains 1 run over a pair of sprockets 5 which are secured to a driving shaft 4 rotatably journalled in the machine frame 6 as well as over still another pair of sprockets 8 which are rotatably mounted on a shaft 7 fixed to the frame 6. To the shaft 4 is secured a pulley 16 which is driven by means of a belt 17. The table 3 is provided with four openings 9 which extend longitudinally of the conveyer 1 and in which are inserted rollers 10a and 10b having longitudinally extending flutings 96 (Fig. 20) projecting slightly above the table 3. A plate 39 is mounted above the conveyer 1 to straighten bent fish that enter the space between conveyer and said plate at its inclined inlet end 75. The rollers 10a and 10b are at their rear ends provided each with a worm 11 which meshes with a worm wheel 12. The worm wheels 12 are secured to the shaft 4 and drive the two rollers 10a in an anticlockwise direction and the rollers 10b in a clockwise direction when viewed from the rear end of the machine as in Fig. 3. The rollers 10a and 10b are by pairs journalled in a rear bracket 13 and a front bracket 14. The two brackets 13 are pivotally mounted on the hubs of the worm wheels 12, and the brackets 14 are secured to the shaft 7. On each side of the fish conveyer 1 is mounted a gauge plate 15 adjustable transversely to said conveyer. On each side of the fish conveyer there is also provided a rotary cutter 18. The cutters 18 are secured to a rotary shaft 19 extending crosswise of the conveyer. Below the cutters 18 are mounted inclined plates 23 for conveying cut off fish heads. The shaft 19 is driven by a gear 20 which in turn is driven by the shaft 4 by means of a countershaft 21 and still another gear 20.

Assuming that the fish are introduced into the pockets between the impellers 2 individually but in unarranged condition with respect to the direction of their head ends, i. e. with their head ends pointing to opposite sides of the conveyer the fish will be acted upon in both of their longitudinal directions when they advance laterally upon the table 3 over the rollers 10a and 10b. The pair of rollers 10a or 10b that acts against the gills, fins and scales (denoted by B in Fig. 20) of the fish, i. e., against their head ends will, however, act more efficiently than those acting against the tail ends. The effect of this pulling action in opposite directions is such that the tendency of the slimy fish to stick to the rollers 10a or 10b will not have any substantial influence on the longitudinal displacement of the fish, and the fish cannot stick together as they are held apart by the impellers 2. Thus each individual fish is moved endwise head first. Thereby the fish are segregated into two groups. That is to say, all of the fish are caused to work away from the central line of the machine between the impellers 2, and head first toward the sides of the machine, so that each group of fish has a uniform arrangement until the fish arrive at the gauge plates 15 and are arrested thereby.

During the sifting the fish are continuously fed laterally and thereafter they arrive at the cutters 18 which decapitate the fish the heads of which drop onto the guide plates 23 whereafter the fish may advance further to dressing means e. g. means for pulling the entrails out of the body of the fish by their cut head ends.

In the embodiment shown in Figs. 4 to 6 the machine operates fundamentally in the same manner as described above but in this case the segregating apparatus consists of a pair of brushes 24 positioned one at each side of the central line of the machine and acting upon the upper side of the fish. The impellers 2 of the chain conveyer 1 are provided with bottom plates 85 for supporting the fish. The brushes 24 are secured each to a shaft 27 which by means of belts 26, countershafts 86 and bevel gears 25 are driven in opposite directions by the shaft 4. The lower part of each rotating brush 24 moves against that gauge plate 15 which is positioned at the same side of the conveyer 1 as the brush as indicated by arrows. On each side of the conveyer is mounted on the shaft 4 a rotary cutter 18 for decapitating the fish.

The embodiment shown in Figs. 7 to 9 comprises many constructional features also appearing in the embodiment shown in Figs. 4 to 6, but instead of rotary separating means a reciprocating relatively soft brush 28 is used which gives the same result as that shown in Figs. 4 to 6. When the brush 28 moves in one direction transversely of the conveyer it displaces in the same direction the fish the scales and fins of which are directed oppositely thereto and when the brush is retracted it displaces in the same direction the fish the scales and fins of which are directed oppositely to the retracting movement. Thereby the brush presses the fish against the bottoms of the conveyer pockets so that said bottoms serve to retain the fish to avoid displacement of the fish in an incorrect direction. The brush 28 is mounted on a rod 30 which is slidably mounted in a guide 29 and provided at its rear end with a roller 81 which by a tension spring 31 is pressed against a cam 33 secured to a rotary shaft 32. The shaft 32 is by the shaft 4 driven by means of two bevel gears 34 and 35 as well as a countershaft 36.

The embodiment shown in Figs. 10 to 12 is a modification of that shown in Figs. 1 to 3 inasmuch as two groups of rollers 10a and 10b are replaced by two reciprocating transversely fluted rakes 37 and 38. The fish are by the impellers 2 fed laterally on a table 70 extending below the lower limb of the conveyer 1 and being attached to the gauge plates 15. The table 70 has an opening 71 through which the flutes of the rakes 37 and 38 project to a level with its upper surface. The rakes 37 and 38 are longitudinally movable in the machine frame and interconnected by a tension spring 41 which urges them against a cam 43 secured to a rotary driving shaft 42. The shaft 42 is by means of a bevel gear 44 connected to another rotary shaft 40 which by means of pulleys 72 and 73 as well as a belt 74 drives the shaft 4 to which the sprockets 5 and head cutters 18 are secured. As shown in Fig. 10a, the cam 43 has such a shape that the rakes 37 and 38 are simultaneously moved apart relatively slowly in the directions of the arrows B, whereas they are moved together rapidly. Thereby the fish are by action against their scales and fins displaced head first against the gauge plates 15 when the rakes are moved apart whilst the fish are retained when the rakes move together. For the purpose of facilitating this segregating into two groups of fish having oppositely directed head ends the flutes of the rakes 37 and 38 may be somewhat oblique so that the flutes of the rakes 37 are inclined to the left and the flutes of the rakes 38 to the right as shown in Fig. 10.

The embodiments described heretofore can be modified or completed so that the two groups of fish being segregated into opposite directions will attain one and the same direction, viz. turning one of said groups and bringing same together with the other group. Figs. 13 to 16 illustrate a modification for that purpose of the apparatus shown in Figs. 1 to 3. Thus at one side of the fish conveyer the cutter 18 is replaced by reversing means consisting of a cylinder 45 provided with a slot 46. In the proximity of the cylinder 45 is mounted a gauge plate 47 which is adjustable transversely to the conveyer 1 and serves to limit longitudinal displacement of the fish moved against same by the rollers 10b. Opposite to the cylinder 45 is mounted a nozzle 59 for intermittently projecting a jet of water on to the fish. For that purpose an arm 76 is pivotally mounted on a pin 77 and provided at one of its ends with a stop valve 79 and at its other end with a finger 78 adapted to be depressed by the fish to open the valve 79. The cylinder 45 is secured to a shaft 48 which is rotatably journalled in an upright 95 on the machine frame. To the free end of the shaft 48 is secured a bevel gear wheel 49 which meshes with another bevel gear wheel 51 secured to a rotary shaft 50. To the shaft 50 is also secured a Geneva-wheel 52 which is turned stepwise (a quarter of a revolution) by a pin 53 on an arm 54 which is secured to a rotary shaft 55. To the shaft 55 is secured a pulley 57 which is driven by a belt 56. The shaft 4 for driving the conveyer 1 extends below and parallel to the shaft 50. To the shaft 4 is secured a toothed wheel 58 which is driven stepwise (one eighth of a revolution) by the pin 53. The ratio of the gear 49, 51 is such that the cylinder 45 rotates through half a revolution when the shaft 50 rotates through one quarter of a revolution, and the cylinder 45 will turn through half a revolution at every time when the stepwise advancing fish conveyer 1 is at rest. The shaft 19 carrying the cutter 18 is driven by the shaft 55 by means of a gear wheel 60 secured to the shaft 55, two rigidly interconnected gear wheels 62 and 63 loosely mounted on a spindle 61, and a gear wheel 64 secured to the shaft 19.

The fish, the heads of which are pointed towards the gauge plate 15, are by the rollers 10a displaced into engagement therewith and decapitated by the cutter 18 as described heretofore. The fish, the heads of which are oppositely directed and displaced by the rollers 10b against the gauge plate 47, are moved transversely further into the slot 46 of the cylinder 45. Each individual fish will, after having been introduced laterally into the slot 46, be swung by turning the cylinder 45 through half a revolution so that the fish occupies the position shown in dash and dot lines in Fig. 22, that is, so that its head will be directed against the gauge plate 15. As shown in Fig. 22 the fish will thereby depress the finger 78 of the arm 76 so that the valve 79 is elevated to open the nozzle 59, whereby a jet of water is projected from the nozzle 59 on to the fish displacing same longitudinally head first over the rollers 10b and further over the rollers 10a by which it is carried into engagement with the gauge plate 15 whereafter it is decapitated by the cutter 18. As soon as the fish releases the finger 78 the valve 79 will by its own gravity descend and shut the nozzle 59. In order not to prevent the displacement of the turned fish against the gauge plate 15 the rollers 10b have no flutes in front of the cylinder 45 as shown.

In the embodiment shown in Figs. 17 to 19 an edgewise positioned plate 65 extends longitudinally of two parallel fish conveyers 1a and 1b. The plate 65 is pivotally journalled on a bracket 66 on the machine frame by means of a pin 67 inserted into the front end 92 of the bracket 66 and extending through oval slots 69 in the head 68 of the plate 65 so that the plate 65 can adjust itself vertically on the pin 67. Rapid reciprocating swinging movements are imparted to the plate 65 by means of a cam 80 secured to the shaft 32 and actuating the roller 81 on the rod 30. In this embodiment the rod 30 has a forked front end 82 which projects into a recess 83 in the plate 65 and embraces a pin 84 inserted into the plate 65 and being parallel to the pin 67. The bevelled lower edge 87 of the plate 65 is inclined in the direction of travel of the fish.

The plate 65 operates above a fish supporting plate 88 between the two fish conveyers 1a and 1b. At the outer sides of the conveyers 1a and 1b are mounted other plates 89 for supporting the head ends of the fish. In addition to the head cutters 18 secured to the shaft 4 another cutter 90 is secured to said shaft between both the conveyers and adapted to cut off the tail ends of the fish.

In the operation of this apparatus the fish are advanced in unarranged condition with respect to their head ends and when engaging the inclined edge 87 of the plate 65 they will lift said plate slightly. The edge 87 of the plate 65 is by swinging said plate reciprocated rapidly crosswise of the path of travel of the fish, and thereby it will act upon the fish against their scales and fins while the fish are supported by the conveyers and the plate 88, whereby the fish are sifted out into two groups one group being displaced head first to the left and the other group being displaced head first to the right in Fig. 17. Thereby the tapered shape of the fish assists in working the fish lengthwise away from the centre of the machine, until the plate 65 has descended into a position in which the top plate 91 of the head 68 rests on the front end 92 of the bracket 66. Thereby the displacement of the fish will be defined by the thickness of their tail ends. That is to say, the thickness of the rear portion of the fish at the cut performed by the tail cutter 90 will be definite and uniform. Consequently the fish will by the cutters 18 and 90 be cut into definite lengths and definite thicknesses at their tail ends.

I claim:

1. In an apparatus for positioning fish, positioning means having a plurality of positioning members operable to simultaneously act upon one and the same side of the individual fish in opposite directions longitudinally thereof, a carrier associated with said positioning members for feeding the fish transversely to bring the fish into engagement with said positioning members, and means associated with said carrier for moving said carrier past said members, said positioning members consisting of two brushes connected to means associated with said carrier and being adapted to rotate said brushes in opposite directions.

2. In an apparatus for positioning fish, positioning means having two rollers operable to simultaneously act upon one and the same side of the individual fish in opposite directions longitudinally thereof, a carrier associated with said rollers for feeding the fish transversely to bring the fish into engagement with said rollers, and means associated with said carrier for moving said carrier past said rollers, said rollers extending longitudinally of the path of travel of said carrier and being connected to means associated with said carrier and being adapted to rotate said rollers in opposite directions.

3. In an apparatus for positioning fish, positioning means having two rollers operable to simultaneously act upon one and the same side of the individual fish in opposite directions longitudinally thereof, a carrier associated with said rollers for feeding the fish transversely to bring the fish into engagement with said rollers, and means associated with said carrier for moving said carrier past said rollers, said rollers being adapted to support the fish in transit and extending longitudinally of the path of travel of said carrier, said rollers being connected to means associated with said carrier and being adapted to rotate said rollers in opposite directions.

4. In an apparatus for positioning fish, positioning means having two rollers operable to simultaneously act upon one and the same side of the individual fish in opposite directions longitudinally thereof, a conveyor associated with said rollers for feeding the fish transversely to bring the fish into engagement with said rollers, said conveyor extending past said rollers, said rollers extending longitudinally of said conveyor at opposite sides of the middle thereof, said rollers being connected to means associated with said conveyor and being adapted to rotate said rollers in opposite directions to cause them to pull the fish away from the middle of said conveyor.

5. In an apparatus for positioning fish, means having a plurality of sifting members operable to simultaneously act upon one and the same side of the individual fish in opposite directions longitudinally thereof, a conveyor associated with said positioning members for laterally feeding fish in unarranged condition with respect to the directions of their head ends and bring them into engagement with said members, said members being operable to act upon the bodies of the fish in opposite directions longitudinally thereof to cause the fish to move head first and to separate into two groups, and means associated with said conveyor for turning one of said groups of fish to cause it to obtain the same direction as the other group with respect to the head ends of the fish.

6. In an apparatus for positioning fish, positioning means having a plurality of sifting members operable to simultaneously act upon one and the same side of the individual fish in opposite directions longitudinally thereof, a conveyor associated with said positioning members for laterally feeding fish in unarranged condition with respect to the directions of their head ends and bring them into engagement with said members, said members being operable to act upon the bodies of the fish in opposite directions longitudinally thereof to cause the fish to move head first and to separate into two groups, means associated with said conveyor for turning one of said groups of fish to cause it to obtain the same direction as the other group with respect to the head ends of the fish, and means associated with said conveyor for bringing said groups together after said turning operation.

7. In a device for positioning fish, positioning means, and means associated with said positioning means for supplying the fish to said positioning means in an unarranged condition with respect to the directions of their heads, said positioning means including a plurality of positioning members adapted to jointly engage one and the same side of each individual fish and also including driving means to cause said positioning members to simultaneously act upon said side of the fish in opposite directions longitudinally of the fish to cause the fish to be displaced head foremost.

8. In a device for positioning fish, positioning means, and means associated with said positioning means for supplying the fish to said positioning means in an unarranged condition with respect to the directions of their heads, said positioning means including a plurality of positioning members adapted to jointly engage one and the same side of each individual fish and also including driving means to simultaneously reciprocate said positioning members in opposite directions longitudinally of the fish to cause the fish to be displaced head foremost.

9. In a device for positioning fish, positioning means, and means associated with said positioning means for supplying the fish to said positioning means in an unarranged condition with respect to the directions of their heads, said positioning means including a plurality of positioning members adapted jointly to form a platform for supporting the fish and also including driving means to simultaneously reciprocate said members in opposite directions longitudinally of the fish to cause the fish to be displaced head foremost.

10. In a device for positioning fish, positioning means, and means associated with said positioning means for supplying the fish to said positioning means in an unarranged condition with respect to the directions of their heads, said positioning means including a plurality of rakes adapted to jointly engage one and the same side of each individual fish and also including driving means to simultaneously reciprocate said rakes in opposite directions longitudinally of the fish to cause the fish to be displaced head foremost.

11. In a device for positioning fish, positioning means, and means associated with said positioning means for supplying the fish to said positioning means in an unarranged condition with respect to the directions of their heads, said positioning means including a plurality of rakes adapted jointly to form a platform for supporting the fish and also including driving means to simultaneously reciprocate said rakes in opposite directions longitudinally of the fish to cause the fish to be displaced head foremost.

12. In a device for positioning fish, a plurality of positioning members adapted to jointly engage one and the same side of each individual fish, driving means operatively associated with said positioning members to cause said positioning members to simultaneously act upon the fish in opposite directions longitudinally of the fish to displace the fish head foremost, and a carrier associated with said driving means and being movable transversely to the direction of displacement of the fish and past said positioning members to bring the fish in an unarranged condition with respect to the directions of their heads in laterally sliding engagement with said positioning members.

PAUL DANIELSSON.

REFERENCES CITED

The following references are of record in the file of this patent:

UNITED STATES PATENTS

| Number | Name | Date |
|---|---|---|
| 1,078,720 | Cleveland | Nov. 18, 1913 |
| 1,134,530 | Hauber | Apr. 6, 1915 |
| 1,614,588 | Ancer-Holth | Jan. 18, 1927 |
| 1,642,444 | Hovden | Sept. 13, 1927 |
| 1,689,920 | Heath | Oct. 30, 1928 |
| 1,945,090 | Smith | Jan. 30, 1934 |
| 1,967,228 | Drevitson | July 24, 1934 |

FOREIGN PATENTS

| Number | Country | Date |
|---|---|---|
| 43,296 | Norway | Oct. 25, 1926 |